(No Model.)  2 Sheets—Sheet 1.
B. MARKHAM.
BOLSTER PLATE.
No. 586,135. Patented July 13, 1897.
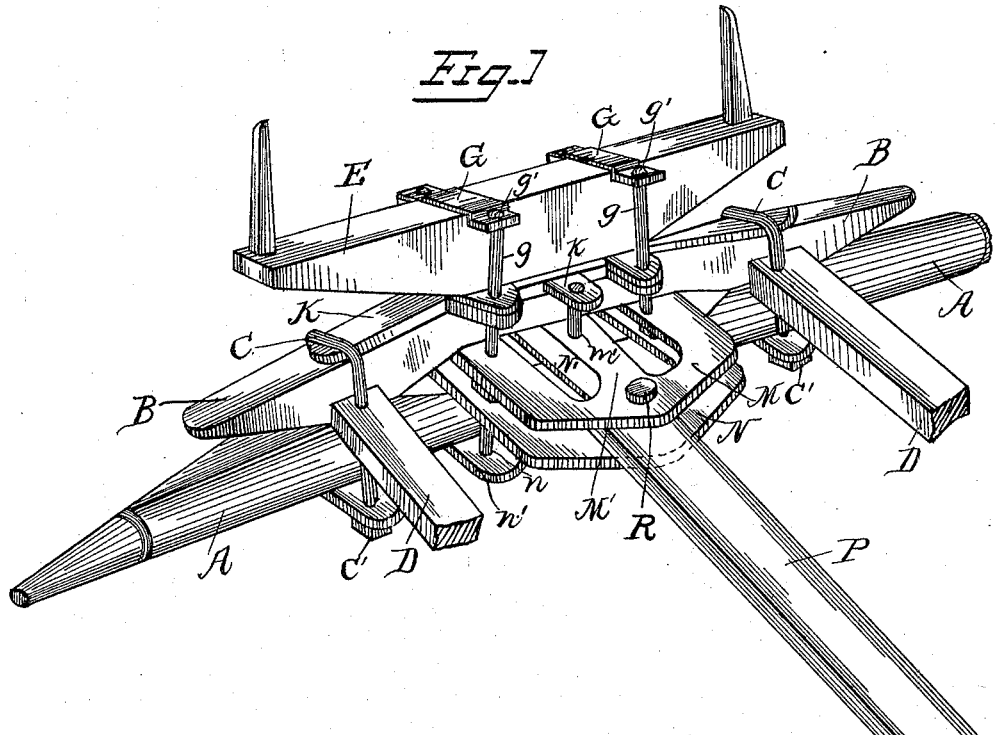
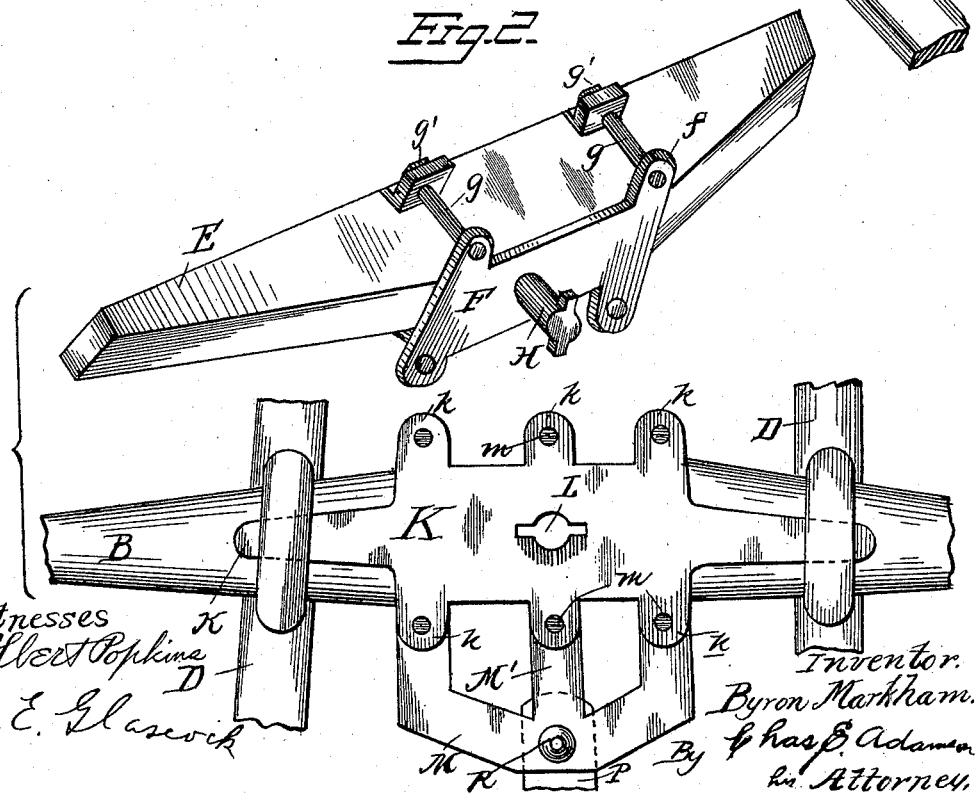
Witnesses
Albert Popkins
A. E. Glasevich
Inventor
Byron Markham.
By Chas. E. Adams
his Attorney

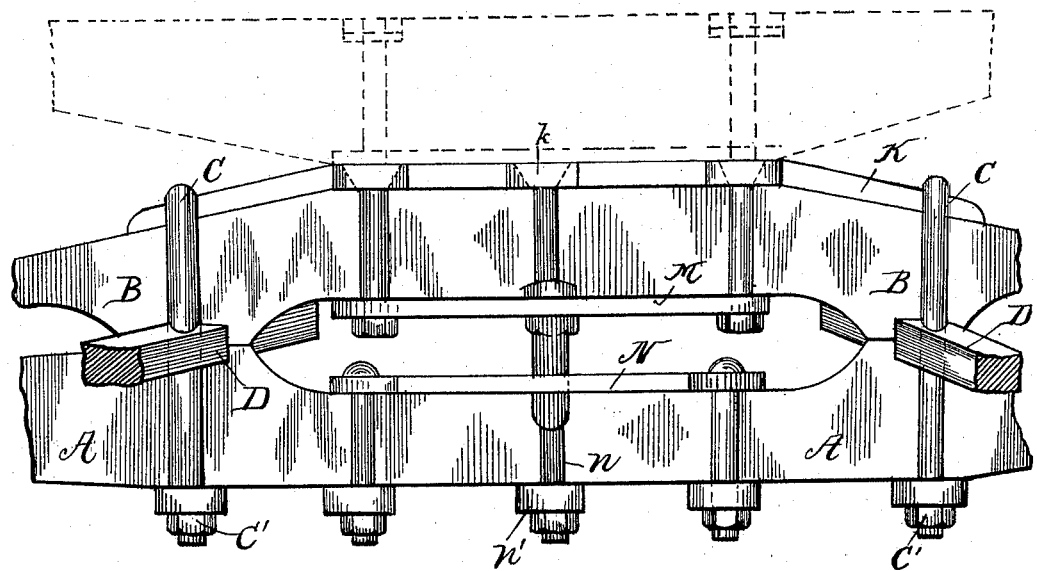
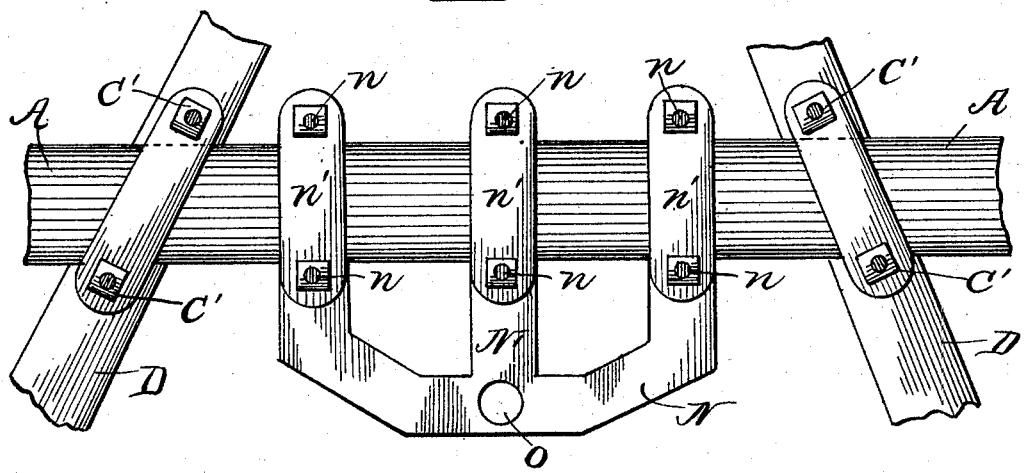

UNITED STATES PATENT OFFICE.

BYRON MARKHAM, OF HELENA, MONTANA.

BOLSTER-PLATE.

SPECIFICATION forming part of Letters Patent No. 586,135, dated July 13, 1897.

Application filed July 27, 1896. Serial No. 600,620. (No model.)

*To all whom it may concern:*

Be it known that I, BYRON MARKHAM, a citizen of the United States, residing at Helena, in the county of Lewis and Clarke and State of Montana, have invented certain new and useful Improvements in Bolster-Plates; and I do hereby declare the following to be a full, clear, and exact description of the invention, such as will enable others skilled in the art to which it appertains to make and use the same.

My invention relates to improvements in bolster-plates for vehicles, especially adapted for use with the ordinary "dead-axle."

My invention consists in certain novelty in the construction, arrangement, and combination of the various parts, all of which I will now proceed to point out and describe, reference being had to the accompanying drawings, in which—

Figure 1 is a perspective of an axle provided with my invention. Fig. 2 is a top plan with the bolster removed. Fig. 3 is a side elevation showing bolster in dotted lines, and Fig. 4 is a plan view of the under side of the axle.

Referring to the said drawings, A indicates the axle; B, the sand-board, secured to the axle by means of suitable clips C, having clip-plates extending transversely under the said axle, the clips being provided with suitable nuts C'. Said axle and sand-board are cut away between their points of connection, so as to leave a space between the same.

At the points where the axle and sand-board are connected the front hounds D are secured between the axle and sand-board, the arms of the clips C' passing through the same. Said hounds rest in seats or recesses formed in the upper side of the axle and lower side of the sand-board.

E is the bolster, to the under side of which is secured a flat bolster-plate F, having lateral projections *f* in a plane with the face of the bolster. The upper side of the bolster is recessed, and the plate is secured thereto by staples G, located in said recesses and connected with the bolster-plate by suitable bolts *g*, the heads of which are countersunk into the plate. Said bolts pass through bolt-holes in the staples and are secured by nuts *g'*.

H is a king bolt or pin having a T-shaped head, said bolt passing through a hole in the bolster-plate and secured in the bolster. When adjusted, the arms of the bolt are at right angles to the length of said bolster.

K is a plate secured to the upper side of the sand-board, the ends of which extend under the clips C. *k* are projections, there being three on each side of the said plate and in a plane with the face thereof.

L is a keyhole-slot in the plate K, corresponding to the shape of the T-head of the king-bolt. To secure the bolster to the sand-board, it is placed on top of the same at right angles thereto, the king-bolt inserted in the keyhole-slot in the plate K and then turned, the said bolster and sand-board being held together by the T-shaped king-bolt and cannot be separated until turned at right angles to said sand-board.

M is a substantially curved or angular brace having a central arm M' secured to the under side of the plate K by means of bolts *m*, which are secured by nuts *m'* to the brace and have their upper ends secured in countersunk apertures *k* in the sand-board plate, as plainly shown in Fig. 3. It will thus be seen that the upper side of the sand-board plate presents a smooth surface on which rests the bolster-plate. N is a similarly-formed brace having the central arm N' secured to the upper side of the axle by bolts *n* and clip-plates *n'*, passing under the axle.

The braces M N register with each other, and they may vary in shape from that shown and described to suit the size and style of the axle.

O O are keyholes in the braces M N and which register with each other.

P is a reach or coupling-pole, the end of which rests between the braces M N and is provided with a hole conforming to the holes in the plates M N.

R is a headed key or pin. This pin passes through the plates M N and through the end of the coupling-pole, thus securing the front and rear running-gear together.

My invention is simple in construction. The running-gear is or main parts are greatly strengthened at their weakest points by doing away with the king-bolt hole which ordinarily passes through the bolster, sand-board, and axle. The reach or coupling-pole can be readily detached or replaced without lifting the bolsters or any load that may be upon them. Further, my bolster-plates provide an increased bearing-surface to those of the ordinary make.

Having thus fully described my invention, I claim the following and desire to secure the same by Letters Patent:

The combination with the axle and sand-board secured thereto by suitable clips and bolts, of a plate K resting on the top of the sand-board provided with apertures and a key-slot and a recess under the slot, a bolster, a plate F on the under side of the bolster secured thereto by clips on the top of the bolster and bolts secured in countersunk apertures in the plate, the said plate resting on the plate on the sand-board and adapted to have a swiveled movement thereon, a king-bolt projecting from the plate on the bolster, a key-shaped head on the end of the bolt adapted to be inserted in the key-slot in the plate on the sand-board, a brace M on the lower side of the sand-board, bolts secured to the brace and countersunk in the apertures in the plate on the sand-board, and a similarly-formed brace N secured to the axle and projecting therefrom, the braces provided with a coupling-pin to which a coupling-pole is adapted to be attached, substantially as described.

In testimony whereof I affix my signature in presence of two witnesses.

BYRON MARKHAM.

Witnesses:
J. E. GRAVES,
A. L. ROSEBOROUGH.